Figure 1:
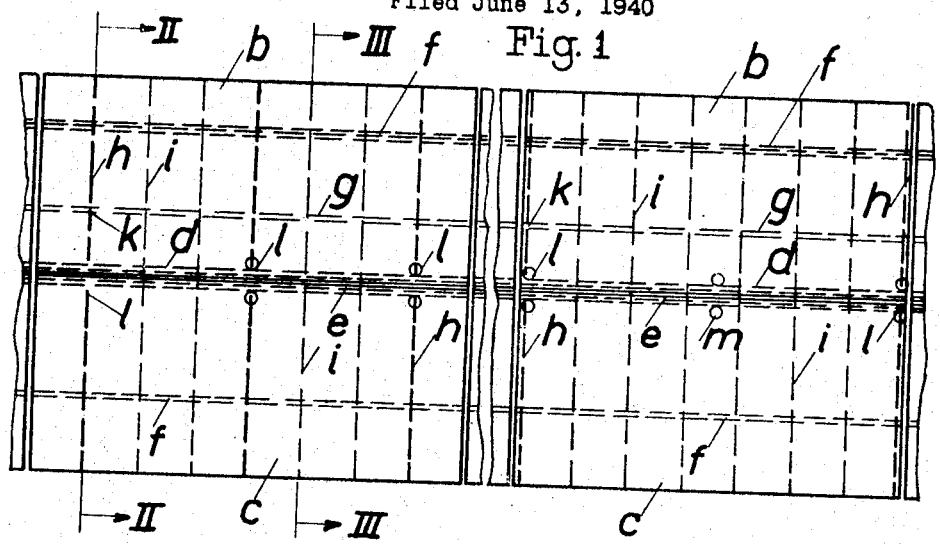

Aug. 15, 1944.   E. SCHELER ET AL   2,355,681
AIRCRAFT WING
Filed June 13, 1940

Inventors:
EMIL SCHELER and
ADOLPH K. ROHRBACH, Deceased,
by GUSTAV EDZARD, Administrator.
By: Richards & Geier
Attorneys:

Patented Aug. 15, 1944

2,355,681

UNITED STATES PATENT OFFICE 2,355,681

AIRCRAFT WING

Emil Scheler, Vegesack, near Bremen, Germany, and Adolf K. Rohrbach, deceased, late of Bremen-Oberneuland, Germany, by Gustav Edzard, administrator, Bremen, Germany; vested in the Alien Property Custodian Application June 13, 1940, Serial No. 340,336
In Germany April 17, 1939

6 Claims. (Cl. 244—124)

This invention relates to an aircraft wing, which is built up around a single spar in the form of a hollow closed body constructed to resist bending and twisting forces and comprises also front and rear wing sections completely enclosing the spar and whose ribs are easily detachably fastened to the spar and wherein the skin, extending between said front and rear section is joined to form joints which extend transversely to the direction of flight and are preferably located at the rear wall of the spar.

The present invention has for its object to build up the front and rear wing sections in the simplest possible manner to save time, to provide for their easy assembly and disassembly within a relatively short time, and to reduce the cost of production and the weight of the wing. For this purpose, some of the ribs supporting the skin or covering of the front and rear wing sections are strengthened and braced to serve as main supporting ribs by means of which the front and rear sections are supportably secured to the spar. As the forces acting upon the wing are transmitted by these main or supporting ribs to the spar, the remaining ribs may be made less strong and function only in an auxiliary manner for taking up slight transverse forces and also air forces that have merely a local effect upon them. This involves considerable simplification of production with respect to the attachable parts and a saving in material.

The main or supporting and the auxiliary ribs are interconnected near the spar by main longitudinal elements extending in the longitudinal axis of the wing and at points spaced from the spar by auxiliary longitudinal elements extending parallel to the spar, these main and auxiliary longitudinal elements serving for transmitting the forces acting upon the wing to the main ribs for transmission to the spar. The longitudinal elements aid also in stiffening the edges of the skin of the front and rear sections with which they are connected for instance by riveting.

Further saving in weight can be effected by detachably arranging on the spar or on the longitudinal elements, besides the main ribs, one or more auxiliary ribs.

The choice of ribs to be strengthened and to serve as special supports is optional. For example, if the front and rear wing sections are subdivided transversely to the direction of flight, it is advisable to strengthen the ribs limiting these parts.

In order to render accessible the fastening points for the main or supporting ribs, for the auxiliary ribs or for the longitudinal elements, the covers or skins of the front and rear wing sections near these points possess oval, circular or similarly formed clearances which may be closed by easily detachable flaps, etc. Such clearances are dispensed with at points where connections, for instance, at the front part of the spar do not require special accessibility. The joints extending transversely to the direction of flight between the skins of the front and rear wing sections need not all be disposed near the rear or front wall of the spar. When the ribs of the front and rear parts respectively embrace the top and underside of the spar, the clearances may be provided near the rear wall of the spar on the upper side of the wing and near the front wall of the spar on the underside of the wing, in which case the front and rear sections may be articulated to the spar so that they can be turned up and down in known manner. A construction of this kind affords the advantage that complete removal of the front and rear sections of the wing to repair control gear, wires, cables, etc., arranged along the side walls of the spar is not necessary, since it suffices to loosen the connections on the top or bottom side of the wing. It is also possible of course to have the ribs of the front wing section embrace the underside of the spar and the ribs of the rear wing section overlie the top side thereof while the front section can be turned up and the rear section turned down.

A further feature of the invention is that the supporting or main ribs of the front and rear wing sections can be used for supporting ailerons, landing flaps, slats, etc., and special stiffening members for bearing them are not needed.

Furthermore, to prevent fire caused by the engine from spreading over the entire wing the supporting ribs of the front and rear wing sections adjacent to the engine may be made solid and thereby enabled to fulfill the function of the fireproof bulkheads hitherto in use.

Figure 2:
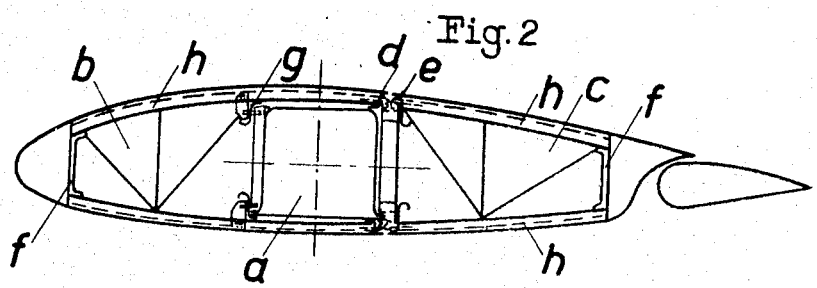
Figure 3:
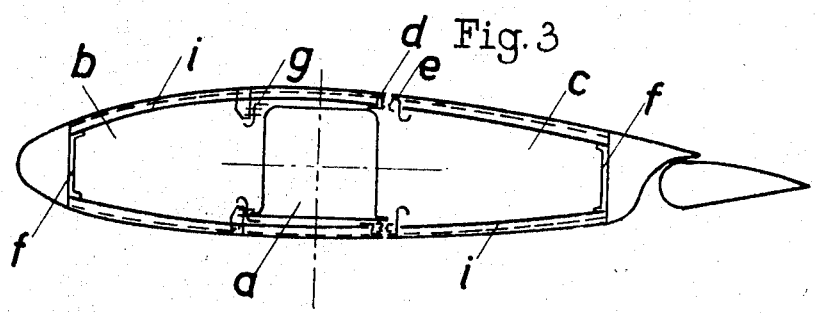
Figure 4:
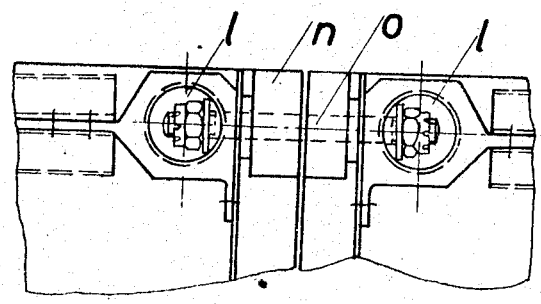
Figure 5:
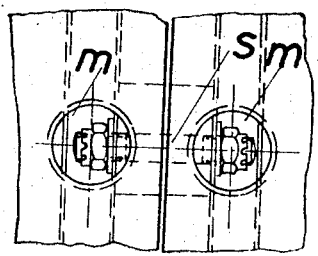

The invention is illustrated by way of example in the accompanying drawing, in which Figure 1 is a plan view of a portion of a wing constructed according to the invention;

Fig. 2, a cross section of the wing on the line II—II, of Fig. 1;

Fig. 3, a cross section of the wing on the line III—III, of Fig. 1;

Fig. 4, a view showing on an enlarged scale a manner of connecting the supporting or main ribs of the front and rear wing sections with one another and with the spar; and Fig. 5 shows on an enlarged scale a connection of the longitudinal elements to the spar.

The wing comprises a spar $a$ having the form of a closed hollow body constructed to resist bending and twisting forces and of front and rear sections $b$, $c$ attached to it transversely to the longitudinal axis of the wing. Ribs $h$, $i$ supporting the skin of the front and rear sections $b$, $c$ are interconnected near the rear wall of the spar by longitudinal elements $d$, $e$ extending in the direction of the longitudinal wing axis and at places more distant from the spar by auxiliary supports $f$. The front wing sections $b$ are, moreover, provided with additional longitudinal elements $g$ located near the front wall of the spar. The auxiliary supports $f$ and the longitudinal sections $d$, $e$, $g$ serve for transmitting the forces acting upon the wing to the specially constructed main or supporting ribs $h$, of which three are shown in the left-hand portion of Figure 1, and for fastening the front and rear sections of the wing to the spar. The front and rear sections shown to the right in Fig. 1 have each only two main ribs $h$. As indicated in Fig. 2, the main ribs $h$ are particularly strong and are stiffened by braces. They transmit the main portion of all forces acting upon the wing to the spar $a$, and the remaining or auxiliary ribs $i$ are therefore weaker and serve only as auxiliary members for taking up slight transverse forces and locally acting air forces.

The main or supporting ribs $h$ are detachably secured to the spar $a$ or to one another at the front wall of the spar $a$, for instance at the points $k$, and at the rear wall thereof at the points $l$ provided with flaps or covers. As fastening means may serve pins or shear bolts, flanges and bores or other means. In the construction shown in Fig. 4 the supporting or main ribs $h$ are connected with the aid of a bolt $o$ having two nuts and arranged in a small bracket $n$ united with the spar $a$.

Fig. 5 shows how the longitudinal elements $d$, $e$ interconnecting the main ribs $h$, $i$ which are secured to the spar $a$ by means of a screw $s$ which can be easily reached through openings $m$ in the wing skin.

The joints extending between the front and rear wing sections $b$, $c$ transversely to the direction of flight are covered for instance by arranging the longitudinal elements $d$, $e$ so that one slides under the other and thereby causes overlapping of the skins.

What is claimed is:

1. An aircraft wing, comprising a closed hollow spar capable of resisting bending and twisting forces and constituting an independent structural element extending over the entire length of the wing, a removable front wing part, a removable rear wing part, said parts extending transversely to said spar and completely enclosing said spar and having contacting surfaces extending along the rear wall of said spar and forming a single seam upon the upper surface of the wing and a single seam upon the lower surface of the wing, each of said parts comprising a covering wing skin, comparatively strong transversely extending supporting ribs connected to an inner surface of the covering wing skin, comparatively weaker transversely extending supporting ribs, sections connected with said ribs and extending close to and along said spar, and a separate auxiliary support in each wing part, said auxiliary supports being comparatively removed from said spar and extending parallel thereto, said auxiliary supports connecting said ribs with each other and also connecting ribs connected to an upper portion of said skin with the ribs connected to a lower portion of said skin; skin-strengthening means situated at a few points of the wing close to said spar, and connecting means carried by said spar opposite said skin-strengthening means and receiving the same for detachably connecting said wing parts with said spar.

2. An aircraft wing in accordance with claim 1, wherein some of the supporting ribs are solid and constitute fireproof bulkheads.

3. In an aircraft wing construction, a single spar extending longitudinally of the wing and capable of withstanding bending and twisting forces, a plurality of main ribs extending transversely of the wing above and below said spar and substantially outlining the contours of the upper and lower surfaces of the wing, longitudinal elements at the front and rear sides of the spar connecting the main ribs for mutual support, means bracing the upper and lower portions of the main ribs with respect to each other, auxiliary ribs positioned between and extending parallel to the main ribs and connected to said longitudinal elements, a front cover member extending over the front ends and above and below the front main and auxiliary ribs and projecting rearwardly above and below said spar, a rear cover member extending over the rear ends of the rear main and auxiliary ribs and the related longitudinal elements and projecting forwardly to the related edges of said front cover member, and attaching units joining the related edges of the resultant front and rear wing sections with the spar, each of said attaching units comprising a bracket on the spar, a bolt extending through the bracket and having a threaded shank, brackets on the front and rear wing sections through which said threaded shank of the bolt extends, and a nut on the shank of the bolt holding the front and rear wing sections tightly in place.

4. In aircraft wing structure, a single spar resistant to bending and twisting, front and rear wing sections removably attached to said spar, said wing sections each comprising a plurality of main ribs laterally spaced along the section each having upper and lower portions extending above and below the spar and substantially defining the contours of the upper and lower surfaces of the wing, parts of the said upper and lower portions having bracket means, longitudinal elements extending along the wing sections alongside of the spar and connecting said main ribs for mutual support, some of said longitudinal elements being connected to the main ribs adjacent to the locations of the bracket means on the main ribs, auxiliary ribs located between adjacent main ribs and connected to said longitudinal elements, front and rear cover members extending around the outer extremities of the main and auxiliary ribs and reaching along the upper and lower portions of said main and auxiliary ribs to the inner extremities thereof, some of said longitudinal elements being secured to the main and auxiliary ribs at their inner extremities, the inner edges of the cover members being secured to the last mentioned longitudinal elements, and attaching means including said bracket means detachably securing the front and rear wing sections fixedly in position to the front and rear of the spar.

5. Aircraft wing construction, as set forth in claim 4, wherein the inner extremities of the upper and lower portions of the main ribs of the front wing section overlap the top and bottom of the spar, and wherein said bracket means include brackets positioned adjacent to the front and rear sides of the spar cooperating with said attaching means in a manner securing the front wing section at two forwardly and rearwardly spaced points of the spar.

6. Aircraft wing construction, as set forth in claim 4, wherein the inner extremities of the upper and lower portions of the main ribs of the front wing section overlap the top and bottom of the spar, and wherein said bracket means include brackets positioned adjacent to the front and rear sides of the spar cooperating with said attaching means in a manner securing the front wing section at two forwardly and rearwardly spaced points of the spar, the bracket means of the rear section being located at the forward terminals of the said upper and lower portions of the main ribs thereof and cooperating with said attaching means at the rear side of the spar and the adjacent brackets of the front wing section, whereby the front and rear wing sections are detachably secured to the spar.

EMIL SCHELER.
GUSTAV EDZARD.
*Administrator of the Estate of Adolf K. Rohrbach, Deceased.*